United States Patent [19]

Knoll et al.

[11] 3,915,573

[45] Oct. 28, 1975

[54] VARIABLE-FREQUENCY INTERFEROMETER RESONANCE FILTER

[75] Inventors: Dieter B. Knoll; Alfons Schmid, both of Boblingen, Germany

[73] Assignee: Hewlett-Packard GmbH, Boblingen, Germany

[22] Filed: Feb. 4, 1974

[21] Appl. No.: 439,154

[30] Foreign Application Priority Data
Feb. 8, 1973  Germany.......................... 2306091

[52] U.S. Cl............... 356/112; 356/106 S; 356/246
[51] Int. Cl.²......................................... G01B 9/02
[58] Field of Search............ 356/106 R, 106 S, 107, 356/112, 246

[56] References Cited
UNITED STATES PATENTS

| | | | |
|---|---|---|---|
| 3,482,919 | 12/1969 | Barringer......................... | 356/106 S |
| 3,524,709 | 8/1970 | Hrdina............................... | 356/246 |
| 3,753,619 | 8/1973 | Thorpe et al..................... | 356/106 S |

OTHER PUBLICATIONS

"Spectrometer for Laser Analysis", NBS Technical News Bulletin, Mar. 1964, pp. 46, 47.

"A Zebra Stripe Display . . . of Vibration", Applied Physics Letters, Gibson & Reid, Nov. 1964.

*Primary Examiner*—Edward S. Bauer
*Assistant Examiner*—Conrad J. Clark
*Attorney, Agent, or Firm*—Patrick J. Barrett

[57] ABSTRACT

An apparatus for measuring the absorption index of a flowing liquid includes a measuring cell and a reference cell. Each cell is formed in the space between and confined by the reflectors of an interferometer of the spherical Perot-Fabry type. The cells are located in parallel in a common body and by means of a common piezo-electric tuning element the distance and thus the resonance frequency of each pair of reflectors can be uniformly varied in order to establish the resonance condition for each liquid in the cells. The voltage supplied to the piezo-electric tuning element for establishing the resonance condition is indicative of the relative absorption index of the liquid under test. The reference cell serves to compensate for unwanted disturbances by changes in temperature, in the flow rate and the like.

7 Claims, 3 Drawing Figures

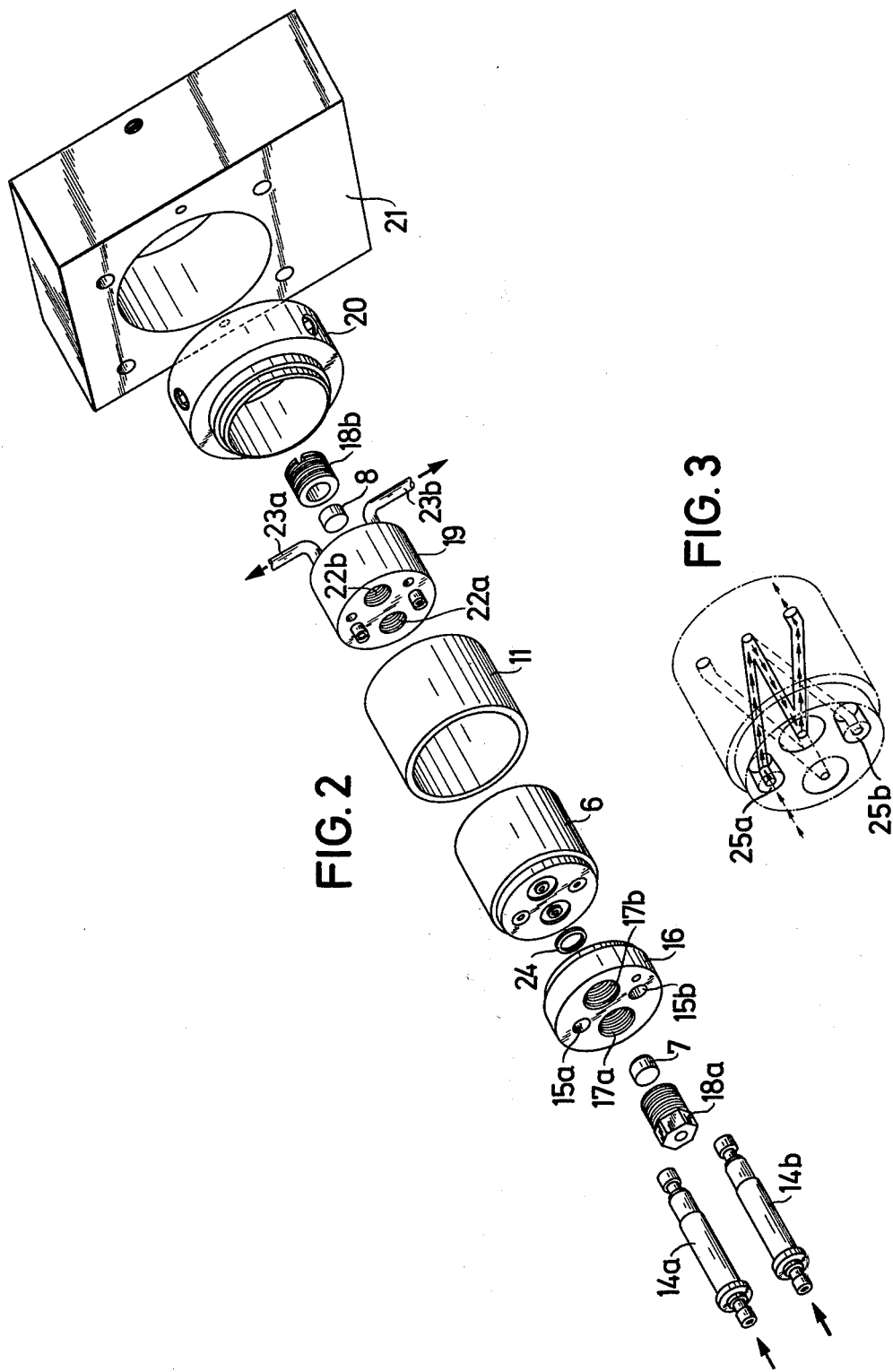

VARIABLE-FREQUENCY INTERFEROMETER RESONANCE FILTER

BACKGROUND AND SUMMARY OF THE INVENTION

The present invention relates to a variable-frequency interferometer resonance filter having its resonant chamber between its reflectors filled with a medium and comprising a piezo-ceramic reference element and means for transmitting a control voltage to the reference element.

It has been known in the art that for measuring the spectral characteristic of spectrally pre-dissected or nearly monochromatic light sources a spherical multiple-interferometer of the Perot-Fabry type can be used which has two interference reflectors arranged at a specific relative distance with a portion of the spectrum of a light source interfering between the reflectors so as to produce interference patterns characteristic of its spectral characteristic. The separation of the interference reflectors is defined by a piezo-ceramic reference element and can by cyclically varied over a sufficiently wide range due to a periodically and constantly varying voltage, by applying a corresponding control voltage to the element, so that the resonance frequency of the interferometer, which acts as a narrow-band filter, is periodically varied over its whole range. Because of hysteresis effects in the reference element, such frequency variation is not linear (leaflet: Model 470 Spectrum Analyser, published by Spectra, 320 North Washington St., Rochester, N.Y. 14625).

The invention now has for an object to provide a resonance filter of the type which can be used for exactly and continuously determining the difference between the refractive indices of two media, preferably two flowing liquids. In particular, it is an object of the present invention to ensure that comparative measurements are not undesirably impaired by variations of the effective cell length.

According to the preferred embodiment of the present invention, this object is achieved by providing a resonance filter of the type described above, in which a double cell is defined by the reflector pairs of two interferometers forming between them two separate central areas for receiving one monochromatic light beam each. These areas can be completely filled with flowing measuring and reference media via separate inlet and outlet ducts, and the distances between the reflector pairs of the interferometers can be uniformly varied by means of a common, controllable reference element. This arrangement provides for the first time an open resonance filter arrangement suited in particular for continuously measuring the relative refractive indices of two flowing media, in which the frequencies of the two filters will be uniformly varied because the effective lengths and, thus, resonance frequencies of the two cells are varied by a common reference element.

Thus, the invention provides a measuring cell through which flowing compressible or essentially incompressible media (liquids) may flow during the measuring process. The fact that a resonance cell having a uniformly variable geometric length is arranged in parallel provides the essential advantage that any interference effects acting uniformly on the resonance frequency of the two cells, can be suppressed from the measurements. This is of particular importance in the case of changes in the length of the two cells resulting from temperature changes and in the case of variations in the pressure or flow rate of the flowing agents. Only when the cells are no longer filled with media having the same refractive indices will a non-uniform variation of the effective length and, thus, the resonance frequencies of the two cells be obtained. Apart from other parameters, the following principle may be applied for determining for instance the change in the refractive index encountered when changing over from one medium to another.

First, the same medium is directed through the two cells, and the piezoceramic element is adjusted to bring the resonance frequency of the two cells in to conformity with the wave length of the light source. When this conformity is achieved the light is passed through the filter, and this point in time is retained in a gating circuit. Thereafter, a medium with a different refractive index enters the measuring cell and varies the latter's resonance frequency until the geometric length of the reference element has been changed by the control voltage provided by the ramp generator in a manner to reestablish the proper resonance condition of the measuring cell. The time interval between the two maximum resonance values is measured and represents the measure for the change of length of the reference element required for re-establishing the proper resonance condition, and this change in length in turn is indicative of the variation of the refractive indice.

Preferably, two spherical multiple-beam interferometers of the Perot-Fabry type having concave, cap-shaped reflector surfaces with the same radius of curvature, may be used. The multiple reflections help to determine the average values of the refractive indices of the reference medium and the measuring medium and, in addition, help to obtain more sharply defined resonance peaks of the light that has passed, than would be the case with a single-reflection resonance filter. The cap-shaped design of the reflector surfaces render their adjustment easier than with coplanar reflector surfaces, since the latter must be adjusted along two axes of freedom, while in the case of concave reflectors adjustments are necessary only along one such axis.

Further, a compact design is achieved by the fact that each of the central cell areas is formed by the middle leg of through-bores provided in a Z configuration the said middle leg extending coparallel with the optical axes — while the other legs, which are arranged at an angle in relation to the optical axes, form the inlets and outlets, the Z-shaped through-bores of the two cells being angularly spaced in axial relation by 180°.

Moreover, the double cell body may advantageously take the form of a cylinder, one end of which is rigidly and the other end of which is resiliently connected to an endplate. The two endplates each carry on their faces opposite the cell body two interferometer reflectors, and the reference element takes the form of a cylinder liner connected to the endplates, receiving the double cell body within the cylindrical space.

Hereafter, a preferred embodiment of the invention will be described with reference to the drawings, in which:

FIG. 2 is an exploded perspective view of a double cell used in a preferred embodiment of the present invention;

FIG. 3 is a perspective view of the double cell illustrated in FIG. 2.

Figure 1:
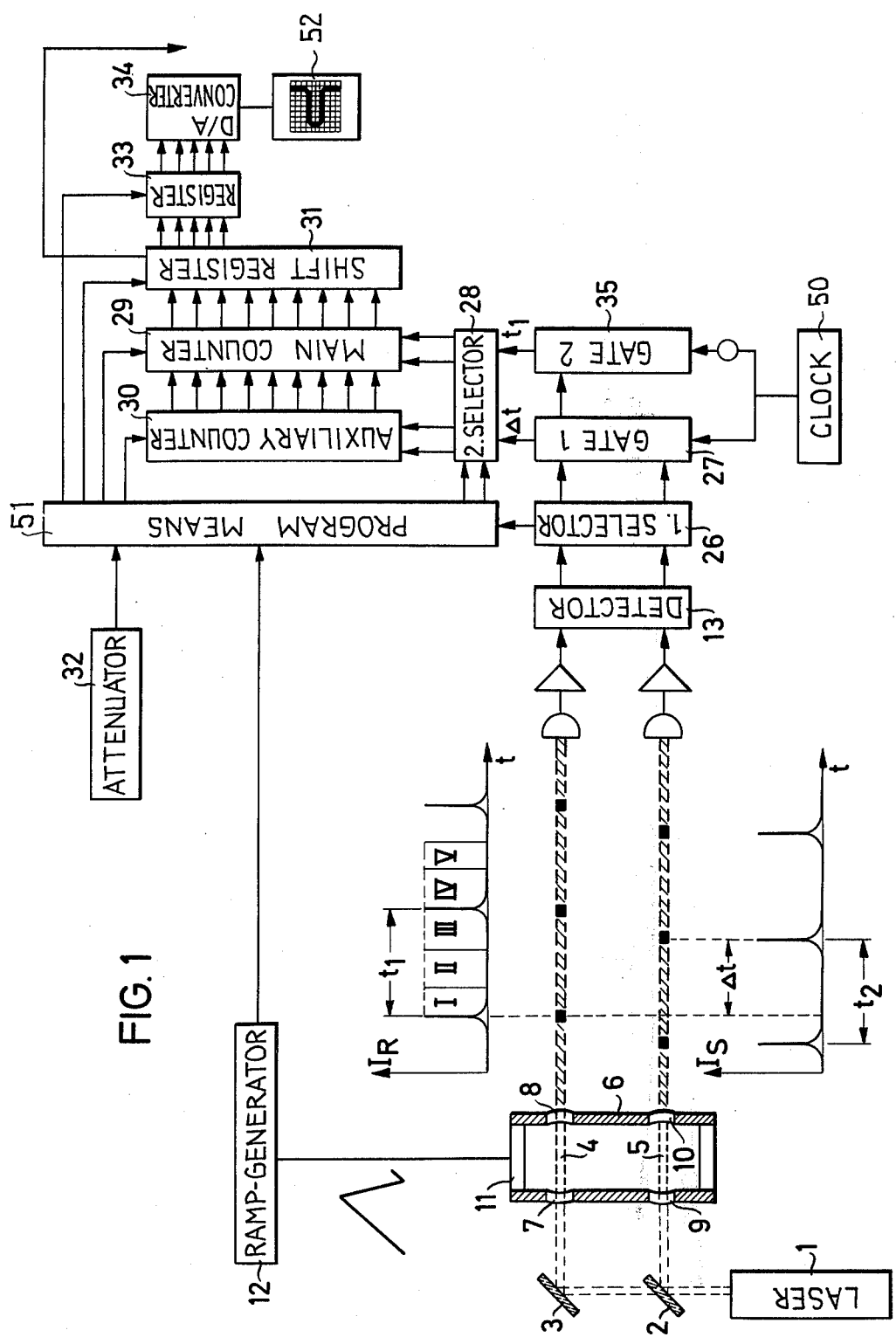
FIG. 1 is a diagrammatic representation of a variable frequency resonance filter and a gating circuit according to the preferred embodiment of the present invention.

According to FIG. 1, a semi-transparent reflector 2 arranged at an angle of 45° in relation to the beam axes and a second, fully reflecting reflector 3 arranged in parallel therewith are provided within the beam path of a laser light source 1. The light reflected by the reflectors enters through windows into reference and measuring channels 4 and 5 respectively of a double cell body indicated diagrammatically at 6, where the largest portion thereof is subjected to multiple reflection between interference reflectors 7, 8 and 9, 10 situated at the ends of the measuring channel and the reference channel, as indicated diagrammatically in FIG. 1. The distance between the pairs of interference reflectors is defined by a piezo-ceramic reference element 11 and is varied periodically over a multiple of the spectral width by means of the output voltage of a ramp generator 12, thus modifying the intensity of the light passing through the double interferometer and producing light pulses which, after having been amplified are converted in a detector 13 into electric pulses and fed into an electronic, essentially digital gating and indicating circuit.

The following is a more detailed description of the individual units.

The laser light source 1 may take the form of a He-Ne-laser emitting monochromatic, coherent light of a known wave length $\lambda$.

The double cell unit has the following arrangement as shown in FIGS. 2 and 3: Inlet lines 14a and b extend through bores 15a and b in one endplate 16 and are connected to the cell body 6. Screwed into each threaded bore 17a and b provided in the endplate is a reflector socket such as 18a, with an interference reflector 7 cemented therein. An endplate 16 is directly connected with a reference element or spacer sleeve 11, while an endplate 19 is screwed at the other side of the spacer sleeve to a threaded flange 20, which in turn is fastened by means of an adhesive to the spacer sleeve and seated in a holder 21. The endplate 19 is likewise provided with two threaded bores 22a and b for receiving reflector sockets with interference reflectors cemented therein and includes outlet lines 23a and b for the reference liquid and the measuring liquid. Ring seal 24 ensure resilient connection between the endplate 16 and the double cell body.

The spacer sleeve consists of a piezo-ceramic material and carries the double cell body 6 consisting of a chemically inert, poorly heat-conductive material, preferably of polytetrafluoroethylene. As can be seen from FIG. 3, the double cell body comprises two Z-shaped channels 25a and b for the reference and measuring liquid. These channels extend over the full length of the double cell body, are spaced about its periphery at an angle of 180° and are connected in sealing engagement to the inlet and outlet lines 14a b and 23a and b in the endplates. The middle legs of the Z-shaped channels extend parallel to the longitudinal axis of the spacer sleeve and are in line with the axis of the corresponding reference or measuring beams, the through-bores 17a and b in the endplates 16 and 19 and the pairs of opposite interference reflectors screwed into the endplates by means of reflector sockets 18a and b.

Thus, the central area between the two pairs of interference reflectors is, in the operational state, completely filled with the flowing reference or measuring liquid so that this central area forms the two cells. Each pair of interference reflectors 7, 8 and 9, 10 which are maintained by means of the spacer sleeve 11 at a defined spacing, the regulation of which will be described in detail hereafter, and which form between them a chamber filled with the measuring fluid or the reference fluid, constitutes one interferometer. The interference reflectors are spherically curved and have reflectance of 99.5 percent so that regarded from the statistical point of view the light entering the chamber emerges finally, after having been subjected to a great number of reflections, through one of the reflector surfaces. In connection with such multiple interferometers of the Perrot-Fabry type it is generally accepted that the reflector separation distance $d$, the refractice index $n$, the wave length $\lambda$ and an integer N as used in the formula $$N \times \frac{\lambda}{4} = n \times d$$

must suffice to determine the resonance or maximum permeability to light of the interferometer. Supposing that the wave length $\lambda$ is known, the variation of the refractive index $n$ of a flowing agent of varying composition can be determined by varying the reflector distance $d$ and maintaining the ordinal number $N$ of the interference spots or resonance maxima at a constant level. The means for controlling the piezo-ceramic reference element for varying the reflector distance has not been shown in detail; it comprises essentially a waveform generator generating a ramp-like control voltage, as for instance a saw-tooth voltage. A waveform generator of this type is employed, for instance, in the above-mentioned "Model 470 Spectrum A Analyser" produced by Spectra, 320 North Washington St., Rochester, N.Y. 14625.

When running through the control range of the common reference element, the resonance ranges of the measuring cell and the reference cell are repeatedly subjected to simultaneous linear scanning, and in these moments each of the two cells transmits one sharply defined resonance light wave which is clearly defined against comparatively wide ranges in which the cell is not permeable to light. These maximum light intensities cause the detector 13 to give electric pulses which are amplified and thereafter transmitted to the digital gating circuit.

The time interval between successive resonance maxima from the measuring cell obtained in one measuring cycle is indicative of the optical length of the measuring cell and it results from the product of the refractive index $n$ (which is to be measured) by the geometric length $d$ of the cell. If the light wave length $\lambda$ and the geometric length $d$ are maintained constant, this time interval can be used to directly determine the relative refractive index $n$ of the medium in the measuring cell.

Prior to starting the measuring process as such, the relative position of the light peaks of the two cells must be measured and allowed for in the zero adjustment, since the cells have different geometric lengths, due to inaccuracies resulting from their production. For example, a length difference as small as $10^{-8}$ cm would already lead to a displacement of the resonance peak important enough to be detected by the measuring arrangement.

Hereafter, the function and the construction principles of the gating circuit will be explained in detail.

At the start of a measurement cycle an external trigger pulse initiates the zero adjustment of the main counter. The first pulse emitted by the detector 13 due to a resonance peak in the reference cell is transmitted via a first selector circuit 26 to a gate circuit 27 so that the latter is rendered conductive and transmits the timing pulses generated by a clock 50 generator at a frequency of 10 MHz, via a second selector circuit 28 to the "forward" count input of a main counter 29 and the "backward" count input of an auxiliary counter 30 which must be previously prepared by corresponding program means 51. Further pulses from the reference cell are suppressed by the first selector circuit 26 and only the next pulse corresponding to a resonance peak of the measuring cell blocks the gate circuit 27 and, thus, the supply of pulses to the counters. If both counters had been set to zero, the digital values stored in the counters will be $\Delta t$ in the main counter and $-\Delta t$ in the auxiliary counter, corresponding to the displacement of the resonance peaks of the two cells.

In subsequent measuring cycles, the value $-\Delta t$ is initially read into the main counter so that the latter will give a reading different from zero only if the measuring medium and the reference medium differ from each other and if a corresponding variation in the resonance displacement is obtained. Any interfering effects acting uniformly on the resonance frequencies of the two cells, do not affect the measurement. Upon completion of the measuring cycle, the measured value stored in the main counter is then transferred to a shift register 31, where it is shifted by a number of bits, in accordance with the adjustment of an attenuator 32, and then stored in a register 33. From the register 33, the stored digital value is fed into a digital-to-analog converter 34, and thereafter to an oscillograph 52 for indication.

In the above description it has been assumed that the gate circuit 27 is successively rendered conductive by means of a reference pulse and non-conductive by a subsequent measuring pulse preceding the next reference pulse. This means that according to FIG. 1 the time interval $\Delta t$ between a reference pulse and the following measuring pulse must be smaller than the time inteval $t_1$ between successive reference pulses. In the event that the value $\Delta t$ approaches the value $t_1$ and that the value $\Delta t$ travels beyond the value $t_1$, this change will make itself felt as a sudden chance of the measured value to a smaller value, since in this case another measuring pulse which is early with respect to the reference pulse in question by $t_2$ will switch off the counter and, thus, effect premature termination of the counting process. Therefore, an additional counting process has been provided for this case which will cause the indication of any continuous variation of the refractive index. To this end, additional pulses are transmitted via a gate circuit 35 and a second selector circuit 28 to the main counter 29 and the auxiliary counter 30. To be quite exact, the transmitted value should correspond to the time interval $t_2$. However, instead of the value $t_2$ the value $t_1$ may be used as a good approximation, because it can be measured with better accuracy since the intervals of the reference pulses will not change at all or only within very narrow limits. In contrast, the time intervals between the measuring pulses may shift so rapidly that the shifting speed approaches the cycle speed and that, accordingly, $t_2$ can no longer be reliably measured. Moreover, the pulse sequences directed via the gate circuits 27 and 35 are to be time-shifted so that the counters may simultaneously count the values $\Delta t$ and $t_1$. As a result of the transmission of the additional pulses, the old value stored in the auxiliary counter is high by $t_1$, and the subsequent measuring values, which are now properly recorded, follow the preceding values steadily without jumps or discontinue, after the main counter has been pre-set for the situation in which $\Delta t$ is greater than $t_1$.

Whereas for the purposes of the foregoing description it has been assumed that $\Delta t$ is higher than $t_1$, there may also be cases in which $\Delta t$ becomes negative, which means that the measuring pulse is progressively delayed until it finally drops behind the referencce pulse. The result is a jump to a measuring pulse $t_2$ later, and the time $t_1$ is then read into the "backward" input of both counters.

In the cases described above the information must be available at the very beginning of the measuring cycle that one of the two cases, and which of them, will be encountered. This knowledge is gained by detecting during the preceding cycle the proximity of such an event and by blanking the undesired pulse and substituting in a suitable form the "critical" measuring pulse in the current measuring cycle.

For this purpose five "time windows" there are associated with the two first spectral widths of the reference pulses and which always coincide with at least one and at most two measuring pulses. In case two measuring pulses occur in the time defined by the windows, only one of them is used for measuring $\Delta t$, whereas the other is blanked by the first selector switch. Preferably, the pulse coinciding with one of the windows II, III or IV will be used for measuring. When the pulse moves for the first time from window IV to window V, this pulse is replaced during the subsequent measuring cycle by the pulse which is located in window II which pulse occurs earlier time the — by $t_2$.

In the event that a resonance peak or a pulse generated thereby moves from window II to window I, the same method will be applied analogously, and the pulse of window IV will be used for measurement. Basically, the gating process is such that the window which contained the peak used for measurement in the preceding cycle, together with its two adjacent windows, will be open for measuring purposes, while resonance peaks in the two remaining windows will be blanked.

What we claim is:

1. A variable frequency interferometric resonance filter comprising:
    a reference cell having a resonant chamber with a pair of reflectors forming a first Perot-Fabry type interferometer and adapted to receive a flowing medium therebetween;
    a measurement cell having a resonant chamber with a pair of reflectors forming a second Perot-Fabry type interferometer and adapted to receive a flowing medium therebetween;
    a source of monochromatic light optically connected to the reference and measurement cells for supplying light to each cell;
    inlet and outlet means connected to the reference and measurement cells for conducting the flowing media into and out of the reference and measurement cells respectively;

a common piezoelectric element connected to the pairs of reflectors for establishing and uniformly varying the distance between the reflectors of each pair of reflectors;

generator means connected to the piezoelectric element for applying a signal thereto for varying the distance between the reflectors of each pair of reflectors in a predetermined manner;

first detector means connected to the reference cell and second detector means connected to the measurement cell for responding to and giving output signals indicative of the occurrence of interference fringes from each of the reference and measurement cells caused by the variation of the distance between the reflectors of each pair of reflectors effected by the piezoelectric element; and signal processing means connected to the first and second detector means and to the generator means for directly measuring the difference in time between the occurrence of the interference fringes from the reference and measurement cells for giving an indication of the distances between the pairs of reflectors in the reference and measurement cells corresponding to the occurrence of said interference fringes to give a measure of the optical characteristics of a medium flowing through the measurement cell.

2. A resonance filter as in claim 1 wherein each Perot-Fabry type interferometer has concave, cup-shaped reflectors with the same radius of curvature.

3. A resonance filter as in claim 2 wherein the reference and measurement cells are enclosed by a thermally insulating material.

4. A resonance filter as in claim 2 wherein the reference and measurement cells are enclosed by an inert, synthetic material.

5. A resonance filter as in claim 4 wherein the material is selected from the group consisting of polytetrafluoroethylene and polytrifluoroethylene.

6. A resonance filter as in claim 2 including a body wherein each of the reference and measurement cells and the associated inlet and outlet means comprise a Z-shaped bore in the body, with the middle legs of the Z-shaped bores being parallel and each such middle leg defining one of the reference and measurement cells, with the outer legs of the Z-shaped bores defining the inlet and outlet means, and with the Z-shaped bores oriented 180° apart with respect to each other about their middle legs.

7. A resonance filter as in claim 6 including a first and a second end plate and wherein:

the body is cylindrical in shape;

the first end plate holds one of the reflectors from each pair of reflectors and is rigidly fastened to the body;

the second end plate holds the other of the reflectors from each pair of reflectors and is resiliently fastened to the body; and the piezoelectric element is in the form of a hollow cylinder surrounding the body and is connected to the first and second end plates.

* * * * *

UNITED STATES PATENT AND TRADEMARK OFFICE
CERTIFICATE OF CORRECTION

PATENT NO. : 3,915,573
DATED : October 28, 1975
INVENTOR(S) : Dieter B. Knoll and Alfons Schmid It is certified that error appears in the above-identified patent and that said Letters Patent are hereby corrected as shown below:

Column 2, line 49, after "axes" delete " — " and insert -- , --;

Column 3, line 60, "14a b" should read -- 14 a and b --;

Column 4, line 13, after "view" insert -- , --;

Column 6, line 11, "discontinues" should read -- discontinuities --; line 18, "referencce" should read -- reference --; line 20, "input" should read -- inputs --; line 41, after "II" insert -- , --; line 42, "time the — by $t_2$" should read -- by the time $t_2$ --.

Signed and Sealed this tenth Day of February 1976

[SEAL]

Attest:

RUTH C. MASON
*Attesting Officer*

C. MARSHALL DANN
*Commissioner of Patents and Trademarks*